UNITED STATES PATENT OFFICE.

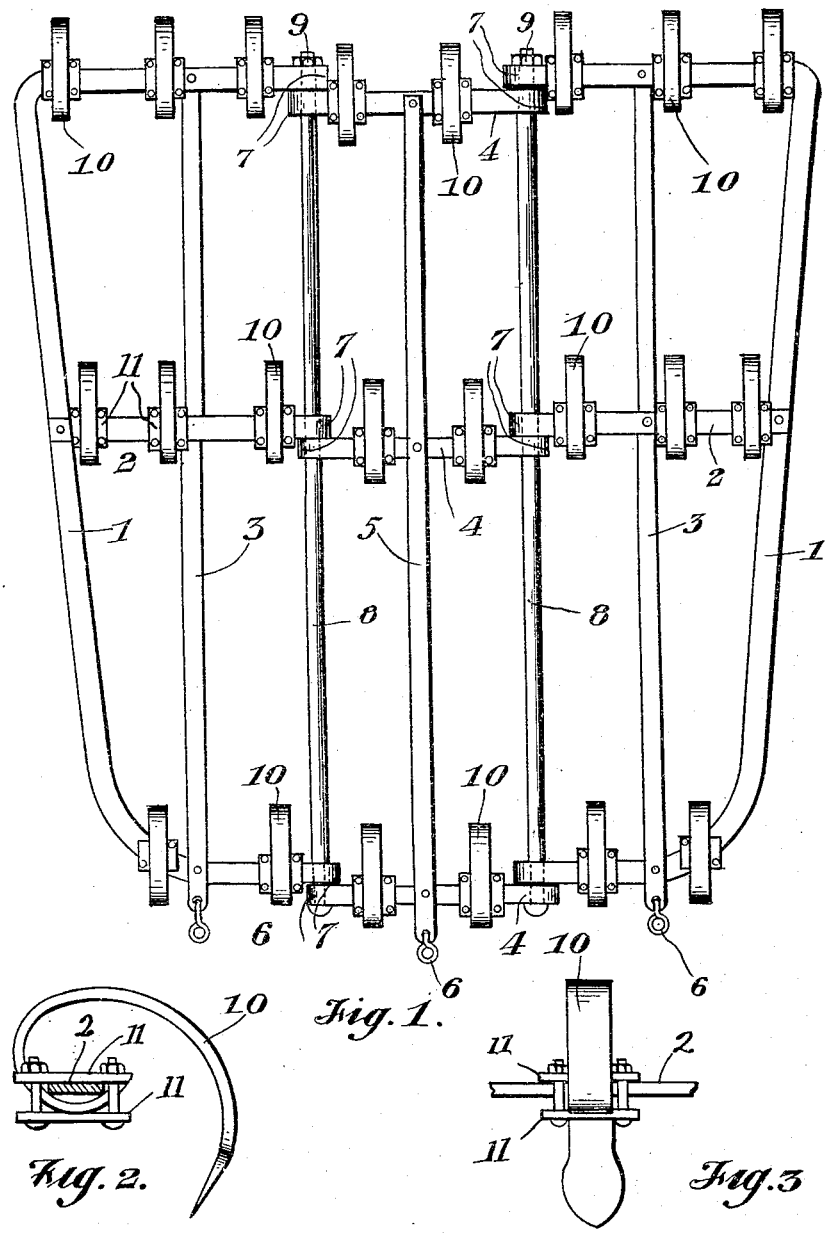

ALFRED BOURRET, OF ST. JOSEPH, QUEBEC, CANADA.

HARROW.

1,218,833.  Specification of Letters Patent. Patented Mar. 13, 1917.

Application filed February 23, 1916. Serial No. 80,082.

*To all whom it may concern:*

Be it known that I, ALFRED BOURRET, a citizen of the Dominion of Canada, residing at St. Joseph, in the county of Beauce, Province of Quebec, Canada, have invented certain new and useful Improvements in Harrows, of which the following is a specification.

The invention to be hereinafter described relates to harrows.

In order to more clearly disclose the construction, operation and use of the invention, reference should be had to the accompanying drawings forming part of the present application. Throughout the several figures of the drawings like reference characters designate the same parts.

In the drawings:—

Figure 1 is a top plan view of the harrow, with the center frame in use.

Fig. 2 is a detail side view of one of the harrow teeth and its mounting.

Fig. 3 is a front view of the same.

The main objects of the invention are to provide a durable compact, and efficient harrow of light construction which will readily adjust itself to the contour of the ground and can be varied inwardly if desired. Further objects are to provide a harrow which can be quickly and easily assembled or disassembled, and which will occupy a minimum of space when not in use.

Referring to the drawings in detail 1 designates the side frames which are of D-shape and formed of one continuous piece of flat steel bar with their outer sides tapered inwardly toward the front. These frames are braced by transverse bars 2 and longitudinal bars 3 riveted thereto and to each other. The center frame consists of several transverse bars 4 rigidly secured at their centers to a longitudinal bar 5. Each of the bars 3 and 5 is provided in its front end which extends slightly beyond its frame, with a double eye 6 for traction attaching purposes.

The ends of frame 1 and bars 2 and 4 are turned downwardly and inwardly to form short integral sleeves 7. These sleeves are equally spaced and are in alinement. When the harrow is assembled, the sleeves on the sides of the central frame are in alinement with the sleeves of the side frame. A long bolt 8 is passed through the alined sleeves on each side of the central frame, and is secured in position by a nut 9 threaded on the back end thereof. By this arrangement, the two side frames and the center frame are all hingedly connected, thus, providing a flexible harrow which will readily adapt itself to the contour of the ground over which it travels. If it is desired to make the harrow narrow, this may be readily accomplished by withdrawing bolts 8 and removing the central frame and then placing the two side frames so that their sleeves are in alinement and inserting one of the bolts therethrough. Also, the width of the harrow can be greatly increased by adding several center frames instead of only one, as is obvious. When not in use the sections of the harrow may be readily folded together so as to occupy very little space.

The side frames 1 and the center frame are provided with properly positioned spring teeth 10 secured in position by rectangular clamping plates 11, above and below the bars thereof and secured together at their corners by bolt and nut means. This permits quick and easy repair or adjustment of the teeth and contributes to the lightness of construction.

It is thought that the construction, operation and use of the invention will be clear from the preceding detailed description.

Changes may be made in the construction, arrangement and disposition of the several parts of the invention without in any way departing from the field and scope of the same and it is meant to include all such within this application wherein only a preferred form has been disclosed.

Having thus fully described my invention, what I claim as new and desire to secure by Letters Patent is:—

In a harrow of the character described, side frames of tapered D-shape each formed of one continuous piece and having its ends bent to form integral sleeves, centrally located bars extending the length of said frames and secured to the ends thereof, transverse bars secured to the sides of the said frame at their outer ends, and to the first-mentioned bars at their centers, and having their inner ends bent to form integral sleeves in alinement with the integral sleeves of the said D frame, a rectangular center frame composed of a center rod and transverse bars rigidly secured thereto at their centers and having their ends bent to form integral sleeves adapted to be placed in alinement with the sleeves of the said frames, bolts adapted to be inserted through the alined sleeves of the center and side frames securing means therefor, teeth carried by the said center and side frames, and means for securing the said teeth to the said frames.

In testimony whereof I affix my signature in the presence of two witnesses.

ALFRED BOURRET.

Copies of this patent may be obtained for five cents each, by addressing the "Commissioner of Patents, Washington, D. C."